US009373049B1

(12) United States Patent
Worley et al.

(10) Patent No.: US 9,373,049 B1
(45) Date of Patent: Jun. 21, 2016

(54) STRAIGHT LINE GESTURE RECOGNITION AND RENDERING

(75) Inventors: Connor Spencer Blue Worley, San Diego, CA (US); Julien G. Beguin, San Francisco, CA (US); Tomer Moscovich, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 13/440,922

(22) Filed: Apr. 5, 2012

(51) Int. Cl.
G06F 3/041 (2006.01)
G06K 9/18 (2006.01)
G06F 3/048 (2013.01)
G06K 9/22 (2006.01)
G06F 3/0488 (2013.01)

(52) U.S. Cl.
CPC ............ *G06K 9/222* (2013.01); *G06F 3/04883* (2013.01)

(58) Field of Classification Search
CPC ... G06F 3/017; G06F 3/04883; G06F 3/0487; G06F 3/0488; G06F 3/04886; G06F 2203/04808
See application file for complete search history.

(56) References Cited

U.S. PATENT DOCUMENTS

| | | | | |
|---|---|---|---|---|
| 5,600,781 A * | 2/1997 | Root | ..................... | G06F 1/1616 345/472.3 |
| 6,057,845 A | 5/2000 | Dupouy | | |
| 8,499,258 B1 * | 7/2013 | Cho | ..................... | G06F 3/04883 715/773 |
| 9,098,186 B1 * | 8/2015 | Worley | ................. | G06F 3/0488 |
| 9,195,305 B2 * | 11/2015 | Markovic | ................ | G06F 3/011 |
| 2001/0004254 A1 * | 6/2001 | Okahara et al. | ............... | 345/157 |
| 2005/0140694 A1 * | 6/2005 | Subramanian et al. | ....... | 345/619 |
| 2005/0244058 A1 * | 11/2005 | Gorbatov et al. | ............. | 382/202 |
| 2007/0140566 A1 * | 6/2007 | Lin et al. | ........................ | 382/203 |
| 2007/0229457 A1 * | 10/2007 | Sakurai | .......................... | 345/157 |
| 2007/0271466 A1 * | 11/2007 | Mak | ....................... | G06F 21/316 713/184 |
| 2008/0040692 A1 * | 2/2008 | Sunday et al. | ................. | 715/863 |
| 2008/0119235 A1 * | 5/2008 | Nielsen et al. | ................ | 455/566 |
| 2008/0292190 A1 * | 11/2008 | Biswas et al. | ................. | 382/187 |
| 2010/0153890 A1 * | 6/2010 | Wang et al. | ................... | 715/863 |
| 2010/0259493 A1 | 10/2010 | Chang et al. | | |
| 2010/0281435 A1 * | 11/2010 | Bangalore et al. | ............ | 715/863 |

(Continued)

OTHER PUBLICATIONS

Gross, "The Electronic Cocktail Napkin—A computational environment for working with design diagrams," retrieved at <<depts.washington.edu/dmgftp/publications/pdfs/ecn96-mdg.pdf>>, Jan. 1996, pp. 1-28.

(Continued)

*Primary Examiner* — Kent Chang
*Assistant Examiner* — William Lu
(74) *Attorney, Agent, or Firm* — Lee & Hayes, PLLC

(57) ABSTRACT

Techniques for determining whether touch-input gestures approximate straight lines and for animating a display with such gestures are described. Some techniques receive a gesture input through a display, define an oriented bounding box for the gesture, and determine whether the gesture approximates a straight line based on an amount of the gesture that is contained within the oriented bounding box. Other techniques determine a linear regression line for pixel locations comprising a gesture, determine distances of the pixel locations from the linear regression line, and render the set of pixel locations to the display based on the distances and a threshold. Further techniques record a gesture input through a display, determine a sequence of frame updates for the gesture, each frame update including a part of the gesture, and provide the frame updates for sequential updating of the display to effect an animation of the gesture on the display.

19 Claims, 7 Drawing Sheets

(56) References Cited

U.S. PATENT DOCUMENTS

| | | | |
|---|---|---|---|
| 2010/0309148 | A1 | 12/2010 | Fleizach et al. |
| 2010/0328353 | A1* | 12/2010 | McDonald et al. ........... 345/671 |
| 2011/0078191 | A1* | 3/2011 | Ragnet et al. ................ 707/780 |
| 2011/0191718 | A1 | 8/2011 | Hinckley et al. |
| 2011/0298809 | A1* | 12/2011 | Toyooka et al. ............. 345/473 |
| 2011/0314113 | A1* | 12/2011 | Noda et al. ................... 709/206 |
| 2012/0089905 | A1* | 4/2012 | Chafy et al. ................. 715/254 |
| 2012/0218305 | A1* | 8/2012 | Patterson et al. ............. 345/652 |
| 2012/0254773 | A1* | 10/2012 | Viswanathan ................ 715/753 |
| 2013/0106710 | A1* | 5/2013 | Ashbrook ..................... 345/173 |

OTHER PUBLICATIONS

Igarashi et al, "Interactive Beautification: A Technique for Rapid Geometric Design," UIST '97 Proceedings of the 10th annual ACM Symposium on User Interface Software and Technology, Oct. 14-17, 1997, 10 pages.

Li, "Protractor: A Fast and Accurate Gesture Recognizer," CHI 2010, Atlanta, Georgia, Apr. 10-15, 2010, 4 pages.

Rubine, "Specifying Gestures by Example," SIGGRAPH Computer Graphics, vol. 25, No. 4, Jul. 1991, pp. 329-337.

Wobbrock et al, "Gestures without Libraries, Toolkits or Training: A $1 Recognizer for User Interface Prototypes," UIST'07, Newport, Rhode Island, Oct. 7-10, 2007, 10 pages.

Office Action for U.S. Appl. No. 13/440,894, mailed on Dec. 18, 2013, Connor Spencer Blue Worley, "Straight Line Gesture Recognition and Rendering", 16 pages.

Final Office Action for U.S. Appl. No. 13/440,894, mailed on May 20, 2014, Connor Spencer Blue Worley, "Straight Line Gesture Recognition and Rendering", 20 pages.

Office action for U.S. Appl. No. 13/440,894, mailed on Sep. 3, 2014, Worley et al., "Straight Line Gesture Recognition and Rendering", 12 pages.

* cited by examiner

STRAIGHT LINE GESTURE RECOGNITION AND RENDERING

BACKGROUND

A large and growing population of users is enjoying entertainment through the consumption of digital content items (or simply "content items"), such as music, movies, images, electronic books, and so on. The users employ various electronic devices to consume such content items. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
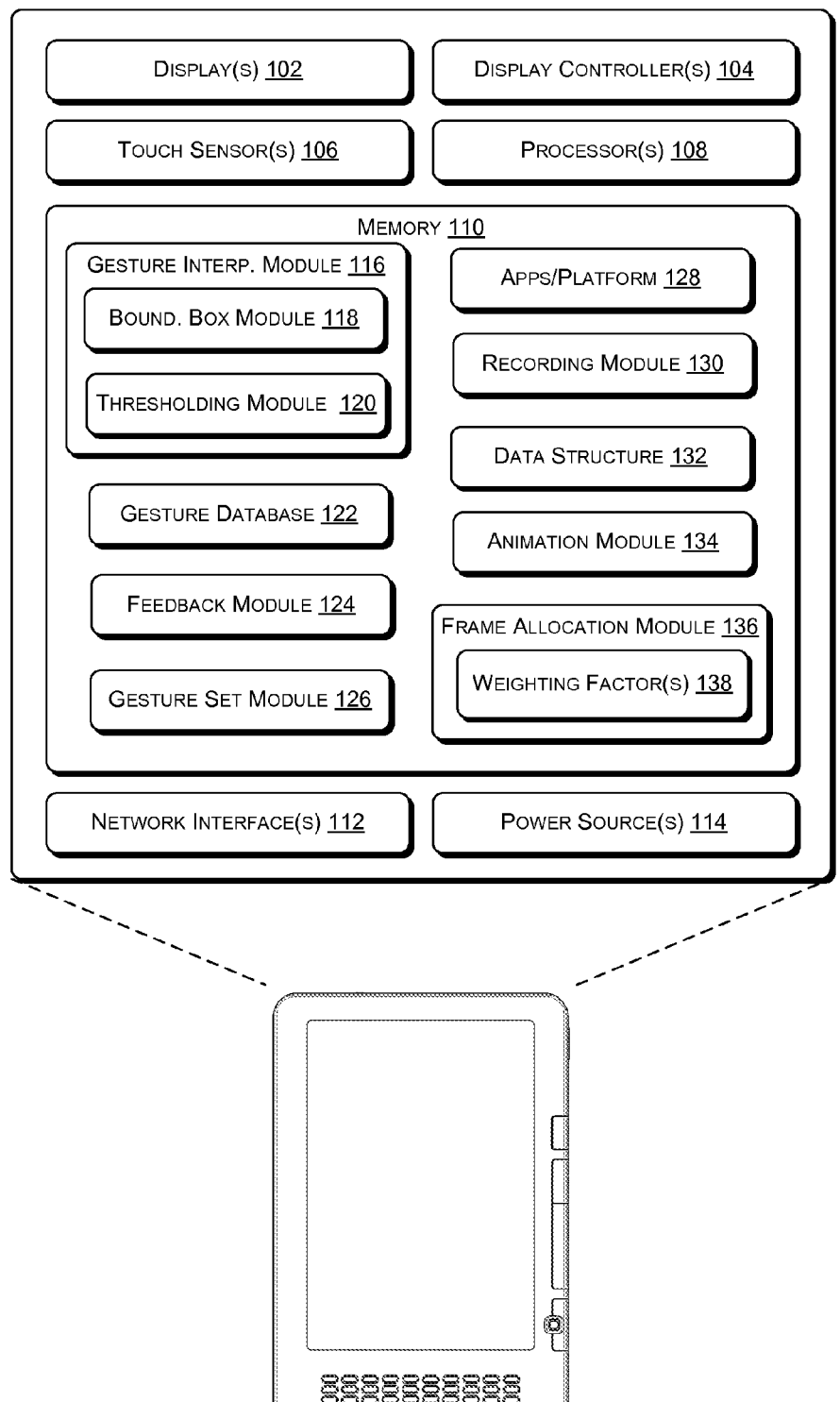
FIG. 1 illustrates an example electronic device configured with functionality for recognizing gestures received through a display of the device as approximating straight lines and for animating lines on the display.

This disclosure describes, in part, techniques for determining whether touch-input gestures approximate straight lines and for animating a touch-sensitive display with such gestures. A first set of techniques described below determines whether a gesture approximates a straight line based on an amount of the gesture that is contained within an oriented bounding box defined for the gesture. A second set of techniques renders a set of pixel locations based on a determination of whether distances of those pixel locations from a linear regression line for the set exceed a threshold. A third set of techniques animates a touch-sensitive display with the gesture by providing frame updates that each includes a part of the gesture to the touch-sensitive display for sequential updating of the touch-sensitive display.

In various embodiments, the first set of techniques is performed by an electronic device that includes a touch-sensitive display configured to receive touch input provided by a stylus or user finger. The electronic device may record the gesture as gesture data, the gesture data including locations touched and times at which locations were touch, and may store the gesture data in a data structure or gesture database.

Upon receiving the gesture, the electronic device may define an oriented bounding box for the gesture based on bounds of the gesture. In some embodiments, the electronic device uses the start and end points as the bounds of the gesture. In other embodiments, the electronic device uses other points near the start and end points as the bounds or two define the bounds. For example, the electronic device may average the locations of the n closest neighboring points of the start and end points and use the averaged points as the bounds. In another example, the electronic device may ignore the start and end points and the n closest neighboring points or may ignore n percent of the points at the start of the gesture and n percent of points at the end of the gesture and use the points closest to the ignored points as the bounds. The size of n may vary proportionally with the size of the gesture. Upon determining the bounds of the gesture, the electronic device defines the oriented bounding box by determining two lines substantially paralleling a line interpolated between the bounds of the gesture and determining two lines substantially perpendicular to the interpolated line. The length of the two lines substantially perpendicular to the interpolated line (also referred to as the "height" of the oriented bounding box) may be proportional to the length of the two lines substantially paralleling the interpolated line (also referred to as the "width" of the oriented bounding box), may be a set height, or may vary and be bounded by a minimum height or a maximum height. In some embodiments, the height of the oriented bounding box may be the minimum height needed to fit the entire gesture within the oriented bounding box.

After defining the oriented bounding box, the electronic device determines whether the gesture is approximates straight line based at least on an amount of points comprising the gesture that are contained within the oriented bounding box. In some embodiments, if the amount meets or exceeds a threshold, the electronic device considers the gesture to approximate a straight line. The threshold may be a set value or may vary based on the length of the gesture. Also or instead, the threshold may vary based on whether previous gestures approximated straight lines. If one or more previous gestures approximated straight lines, the electronic device may lower the threshold. In other embodiments, the electronic device may determine a ratio of the height of the oriented bounding box to the width of the oriented bounding box and, if the ratio is less than a threshold, the electronic device considers the gesture to approximate a straight line. In further embodiments, the electronic device may reference a gesture database that includes gestures profiles associated with electronic device users in determining whether the gesture approximates a straight line.

In various embodiments, the electronic device may present a user of the electronic device with a user interface element informing the user that the electronic device has or has not determined the gesture to approximate a straight line and, optionally, asking the user to confirm the determination (e.g., by tapping on a visual control, etc.).

In some embodiments, the electronic device may then render an animation of the gesture being drawn on the touch-sensitive display. Techniques for rendering the animation are described below.

Further, the electronic device may perform an action based on one or more straight line gestures, such as launch an application execute a command, based on straight line gesture(s). For example, if a user makes two horizontal straight line and two vertical straight lines in sequence, the electronic device may launch a tic-tac-toe application. In another example, if a user makes a predefined number of horizontal line gestures (e.g., four), the electronic device may present a lined paper graphic user interface on the electronic paper display to receive user input. In a further example, if the user makes a gesture approximate a straight line through displayed text, the electronic device may delete that text.

In various embodiments, the second set of techniques may also be performed by an electronic device having a touch-sensitive display. Also, applications of the electronic device may generate sets of pixel locations comprising gestures, and such applications may be found in both electronic devices with touch-sensitive displays and those without touch-sensitive displays. The pixel locations correspond to pixel locations on the touch-sensitive display where the display was touched or where the gesture is to be rendered.

The electronic device may receive the set of pixel locations comprising the gesture and may determine an average pixel location from the set of pixel locations. The electronic device may utilize that aver pixel location and a linear regression analysis on the pixels locations of the set of pixel locations to determine a linear regression line. The electronic device may then determine a length of that linear regression line. To determine the length, the electronic device may define a boundary box to contain the set of pixel locations, the bounding box oriented to an x-y axis that is aligned with the display. The bounding box has a minimum size necessary to completely contain the pixel locations. The electronic device then determines a diagonal of the bounding box and sets the length of the linear regression line to the length of the diagonal.

The electronic device then calculates distances from the pixel locations to the linear regression line and determines if the distances are less than a threshold. In response to determining that the distances are less than a threshold, the electronic device may render the set of pixel locations on the touch-sensitive display as a straight line. If the distances meet or exceed the threshold, the electronic device may render the set of pixel locations as they were received or generated. In some embodiments, the threshold may be proportional to the size of the gesture or may be a set value.

In some embodiments, the rendering may include rendering an animation of drawing the gesture on the touch-sensitive display. Techniques for rendering the animation are described below.

In various embodiments, the third set of techniques may also be performed by an electronic device having a touch-sensitive display, such as an electronic paper display. The electronic device records gestures made by the user into a data structure and, optionally, a gesture database. The gestures may be represented in the data structure by gesture data that includes locations on the touch-sensitive display that were touched (e.g., pixel locations) and by times at which the locations were touched. In addition to storing recorded gestures, the data structure may also store data representative of programmatically generated gestures. Such data may include location and time data to be used in rendering the programmatically generated gesture on the touch-sensitive display. In some embodiments, the gestures recorded in the data structure may be used to train machine learning algorithms how to read human writing.

In some embodiments, the electronic device may linearize the gesture data, updating the locations to different positions that would have been touched had a user drawn an entirely straight line. The electronic device may linearize the gesture data in response to determining whether the gesture was intended to be a straight line by utilizing a bounding box and thresholds or a regression analysis, as described above with reference to the first and second sets of techniques.

After recording and storing the gesture data, the electronic device may determine a sequence of frame updates, each frame update including a part of the gesture data. The electronic device uses these frame updates to provide an animation of drawing the gesture on the touch-sensitive display. To determine the frame updates, the electronic device first determines the number of frame updates by dividing a time interval in which the gesture was received, from its start to finish, by a frame rate of the electronic device. The frame rate is the rate at which the electronic device is capable of updating the touch-sensitive display. For example, if the time interval in which the gesture is received is two second, and the frame rate is thirty two frames per second, the electronic device would determine the number of frame updates to generate to be sixty four. The electronic device may then divide the gesture into sixty four parts based on the recorded times associated with the gesture locations. The time interval in which the gesture is received is divided into sixty four time slots, each corresponding to a frame update. The electronic device then associates times fitting into each time slot and their associated locations with the frame update corresponding to that time slot. Each frame update, then, includes the times and locations associated with its corresponding time slot. The frame updates may each also include a specification of the region of the touch-sensitive display that includes the locations comprising the part of the gesture data.

The electronic device may then provide the sequence of frame updates for sequential updating of the touch-sensitive display. The electronic device may provide the frame updates to a display controller associated with the touch-sensitive display or may first provide them to a frame allocation module. The frame allocation module allocates frame updates of the touch-sensitive display among a plurality of applications and components and may use weighting factors to assign priorities to the applications and components. The frame allocation module may then also provide the sequence of frame updates to the display controller. The display controller causes sequential updating of the touch-sensitive display at the frame rate, each update adding a part of a gesture data included in a frame update to parts of the gesture data captured in previously rendered ones of the sequence of frame updates. The effect of this sequential updating with small increments of the gesture data is to create the above-described animation of the gesture on the touch-sensitive display.

Example Electronic Device

FIG. 1 illustrates an example electronic device 100 configured to implement the techniques described above. While FIG. 1 illustrates the device 100 as a dedicated electronic book reading device, in other implementations the device 100 may comprise any other type of mobile electronic device (e.g., a laptop computer, a tablet computing device, a multifunction communication device, a portable digital assistant (PDA), etc.) or non-mobile electronic device (e.g., a desktop computer, a television, etc.). In addition, while FIG. 1 illustrates several example components of the electronic device 100, it is to be appreciated that the device 100 may also include other conventional components, such as an operating system, system busses, input/output components, and the like.

Regardless of the specific implementation of the electronic device 100, this device 100 includes one or more displays 102 and corresponding display controllers 104. The one or more displays 102 (referred to herein as "touch-sensitive display 102") may represent liquid crystal displays (LCDs), plasma displays, Light Emitting Diode (LED) displays, electronic paper displays, and/or the like. In some instances, the electronic device 100 utilizes at least one electronic paper display for rendering content on the device 100.

Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In one implementation, an electronic paper display comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray.

Of course, while one example has been given, it is to be appreciated that the electronic paper displays described herein may comprise any other type of electronic paper technology, such as gyricon displays, electrowetting displays, electrofluidic displays, interferometric modulator displays, cholestric liquid crystal displays, and the like. In addition, while some of the displays described below are discussed as rendering black, white, and varying shades of gray, it is to be appreciated that the described techniques apply equally to electronic paper displays capable of rendering color pixels. As such, the terms "white", "gray", and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter.

In addition to including the one or more touch-sensitive displays 102, FIG. 1 illustrates that the device 100 includes one or more touch sensors 106. In some instances, at least one touch sensor 106 resides underneath or on top of a corresponding touch-sensitive display 102 to form a touch-sensitive display that is capable of both accepting user input and rendering content corresponding to the input. In other instances, the device 100 may include a touch sensor that is adjacent to a display. It is to be appreciated that each of the techniques described below may apply to instances where the touch sensor 106 and the touch-sensitive display 102 form a touch-sensitive display and instances where the sensor 106 and the touch-sensitive display 102 do not.

The touch sensor 106 may comprise a capacitive touch sensor, an interpolating force sensitive resistance (IFSR) sensor, or any other type of touch sensor. In some instances, the touch sensor 106 is capable of detecting touches as well as determining an amount of pressure or force of these touches. For instance, the touch sensor 106 may comprise an ISFR sensor resident behind a touch-sensitive display 102, such that a user is able to draw upon the display utilizing a writing instrument, such as a stylus, a finger of the user, or the like.

FIG. 1 further illustrates that the electronic device 100 includes one or more processors 108 and memory 110, as well as one or more network interfaces 112 and one or more power sources 114. The network interfaces 112 may support both wired and wireless connection to various networks, such as cellular networks, radio, WiFi networks, short range networks (e.g., Bluetooth), IR, and so forth.

Depending on the configuration of the electronic device 100, the memory 110 (and other memories described throughout) is an example of computer-readable storage media and may include volatile and nonvolatile memory. Thus, the memory 110 may include, but is not limited to, RAM, ROM, EEPROM, flash memory, or other memory technology, or any other medium which can be used to store media items or applications and data which can be accessed by the electronic device 100.

The memory 110 may be used to store any number of functional components that are executable on the processors 108, as well as data and content items that are rendered by the electronic device 100. Thus, the memory 110 may store an operating system and a storage database to store one or more content items, such as eBooks, audio books, songs, videos, still images, and the like. The memory 110 of the electronic device 100 may also store one or more content presentation applications to render content items on the device 100. These content presentation applications may be implemented as various applications depending upon the content items. For instance, the application may be an electronic book reader application for rending electronic books, an audio player for playing audio books or songs, a video player for playing video, and so forth.

As illustrated, in this example the memory 110 stores a gesture interpretation module 116 having a bounding box module 118 and a thresholding module 120. In some embodiments, the gesture interpretation module 116 listens for touch events registered by the touch sensors 206 and retrieves pixel-mapped locations (also referred to as pixel locations) from the touch sensors 106. The gesture interpretation module 116 may also retrieve time stamps associated with times at which the locations were touched, or may determine timestamps to associate with the locations based on times at which the locations are retrieved. In other embodiments, the platform of the electronic device 100 or an application may invoke the gesture interpretation module 116 and either cause the gesture interpretation module 116 to retrieve the locations from the touch sensors 106 or cause the touch sensors 106 to provide the locations to the gesture interpretation module 116. The platform or application may invoke the gesture interpretation module 116 when the electronic device is in a specific mode or context, such as a stylus input mode, and the touch sensors 106 register touch input.

Upon receiving, retrieving, or determining locations and times associated with a gesture received as touch input, the gesture interpretation module 116 invokes its bounding box module 118 to define an oriented bounding box for the gesture. In a first set of embodiments, the bounding box module 118 determines bounds of the gesture and defines an oriented bounding box based on bounds of the gesture. In a second set of embodiments, the bounding box module 118 defines an oriented bounding box with the minimum dimensions and orientation to fit the entire gesture within the bounding box.

In the first set of embodiments, the bounding box module 118 determines the bounds of the gesture in one of a number of ways. First, the bounding box module 118 may use the start and end points of the gesture. These are the first and last locations touched when the user enters the touch input. Second, the bounding box module 118 may select the start and end points and their nearest n neighbors and averages the locations of those points. The magnitude of n may vary with the size of the gesture. For example, if the gesture involved touching one hundred pixel locations, the bounding box module 118 may use an n of five. In this example, the bounding box module 118 would average the start point and its nearest five neighbors (i.e., the first six pixel locations of the gesture) and would also average the end point and its nearest five neighbors (i.e., the last six pixel locations of the gesture). The bounding box module 118 would then use these averaged points as the bounds of the gesture. Third, the bounding box module 118 may ignore the start and end points and their nearest n neighbors, or may ignore n percent of the points of the gesture at the start of the gesture and n percent of the points of the gesture at the end of the gesture, and use the points closest to those ignored as the bounds of the gesture. In some embodiments, the bounding box module 118 could ignore a specified number of points at the start of the gesture and the same specified number of points at the end of the gesture and, if the gesture is longer than a threshold, could ignore n percent of the gesture at its beginning and end, as is described above. For example, if n is again five, the bounding box module 118 could ignore the first six and last six points/pixel locations and use the seventh pixel location and seventh from last (counting the last) pixel location as the bounds of the gesture. The advantage of averaging points or ignoring points at the start and end of a gesture is that gestures often involve what can be called a "start curl" or an "end curl"—unintended touch movements at the beginning or end of touch input. For example, a user may trail off to the side at the end of drawing a straight line with a stylus as part of lifting the stylus from the touch-sensitive display 102. Because these movements are unintentional, ignoring them or reducing their impact results in a more accurate interpretation of gestures.

After determining the bounds of the gesture, the bounding box module 118 interpolates a line between the bounds and defines a bounding box from two lines that substantially parallel the interpolated line. These parallel lines are to either side of the interpolated line and have substantially the same length as the interpolated line. To complete the bounding box, the bounding box module 118 adds two lines that are substantially perpendicular to the parallel lines and connect to those lines. The length of the perpendicular lines may correspond to a set length or may vary, for example, based on the length of the parallel lines. The length of the parallel lines may also vary, in some embodiments. For example, the length of the perpendicular lines may be set to be five percent the length of the parallel lines. In another example, the ratio between the lines may itself vary between a minimum value and a maximum value based on the magnitude of the length of the parallel lines. For instance, a parallel line with a sixty pixel length may be associated with a five percent ratio and a parallel line with a one hundred pixel length may be associated with a ten percent ratio. In this example, a minimum value of 3 pixels and a maximum value of twelve pixels could be used as a floor and a cap for the length of the perpendicular lines.

Once the bounding box module 118 has created the oriented bounding box in accordance with either the first or second sets of embodiments, the bounding box module 118 invokes the thresholding module 120.

In the first set of embodiments, the thresholding module 120 determines whether the amount of the gesture contained in the oriented bounding box meets or exceeds a threshold. The threshold may be a set value or may vary based on the size of the gesture. For example, with a small gesture (e.g., thirty pixel locations touched), a high threshold (e.g., ninety-five percent) may be used. With a larger gesture (e.g., two hundred pixel locations), a lower threshold (e.g., ninety percent) may be used. Also, the thresholding module 120 may vary the threshold used based on whether one or more immediately previous gestures approximated straight lines. The thresholding module 120 may determine that previous gestures approximated straight lines by inquiring of the gesture set module 126 or an application, platform, database, or data structure that tracks or records gestures. In response to determining that the previous gestures approximated straight lines, the thresholding module may, for example, reduce the threshold by five percent. If the amount of the gesture inside the bounding box meets or exceeds the threshold, the gesture interpretation module 116 determines that the gesture approximates a straight line.

In the second set of embodiments, the thresholding module 120 may interpret the gesture in one of two ways. First, since the oriented bounding box includes the entire gesture in the second set of embodiments, the thresholding module 120 may compare the length of a bounding box dimension more perpendicular to the gesture to the length of the bounding box dimension more parallel to the gesture. If the ratio of the lengths is below a threshold, the gesture interpretation module 116 considers the gesture a straight line. For example, if the threshold is 0.15, the more perpendicular bounding box dimension is ten pixels, and the more parallel dimension is one hundred pixels, the thresholding module 120 would determine that the ratio of the dimensions is 0.1, and that the ratio is less than the threshold. In the example, then, the gesture approximates a straight line.

In another way of interpreting the gesture, the gesture interpretation module 116 first determines an average location of a set of pixel locations comprising the gesture. Using this average location and a linear regression analysis on the set of pixel locations, the gesture interpretation module 116 determines a linear regression line for the gesture. The gesture interpretations module 116 then determines a length of the linear regression line. To determine the length, the gesture interpretation module 116 may define a boundary box to contain the gesture, the bounding box oriented to an x-y axis that is aligned with the display. The bounding box has a minimum size necessary to completely contain the pixel locations. The gesture interpretation module 116 then determines a diagonal of the bounding box and sets the length of the linear regression line to the length of the diagonal.

The gesture interpretation module 116 then calculates distances from the pixel locations comprising the gesture to the linear regression line, and invokes the thresholding module 120. In computing the distances, the gesture interpretation module 116 may use the shortest distance between each pixel location and the linear regression line.

The thresholding module 120 may then determine if the average distance or total distance is less than a threshold. The threshold may be a set value or may vary based on the size of the gesture. If the average distance or total distance is less than the threshold, the gesture interpretation module 116 determines that the gesture approximates a straight line.

As shown, the memory 110 of the electronic device 100 may also include a gesture database 122. The gesture database 122 includes gesture profiles associated with electronic device users and may be used by the gesture interpretation module 116 in interpreting a gesture or in validating an interpretation. For example, the bounding box module 118 may consult the gesture database 122 to determine if the electronic device user typically has end curls included in his or her gestures. Based on this information, the bounding box module 118 may select among the different above-described techniques for determining the bounds of the gesture. In another example, the gesture interpretation module 116 can validate its determination of whether a gesture approximates a straight line by comparing the gesture to other gestures in the gesture database 122 that are classified as straight lines.

In various embodiments, the memory 110 of the electronic device 100 further includes a feedback module 124. The feedback module 124 may render a graphic user interface or control that informs the electronic device user that the gesture has been interpreted to be a straight line and, optionally, asks the electronic device user to confirm whether the electronic device user intended to enter a straight line. The electronic device user may answer the question and provide feedback through touch interaction with the touch-sensitive display 102 (e.g., using a stylus or finger) or through interaction with one or more physical keys, buttons, or controls of the electronic device 100. The feedback module 124 may be invoked by the gesture interpretation module 116 or by the platform or an application that is taking action or refraining from taking action based on whether the gesture interpretation module 116 determined the gesture to approximate a straight line.

As illustrated, the memory 110 of the electronic device 100 includes a gesture set module 126. The gesture set module 126 monitors gestures and, in response to determining different gestures or sequences of gestures have occurred, launches corresponding different applications or takes different actions. For example, the gesture set module 126 may track sequential straight line gestures. In response to determining that the last four gestures include two generally parallel straight lines and two lines generally perpendicular to those, forming a tic-tac-toe grid, the gesture set module 126 may launch a tic-tac-toe application. In response to determining that the last four gestures were four generally parallel lines, the gesture set module 126 may cause the platform or an application to present a lined paper graphic user interface. The gesture set module 126 may receive indications regarding the gestures and whether the gestures approximate straight lines from the gesture interpretation module 116 or from a platform or application of the electronic device 100.

In various embodiments, the memory 110 of the electronic device also includes applications 128 and platform 128. These applications/platform 128 may be the applications and platform referred to above that manage modes of the touch-sensitive display 102, that manage the handling of received gestures by invoking the gesture interpretation module 116 and/or the gesture set module 126, and that are launched by the gesture set module 126. For example, applications 128 may include a tic-tac-toe application 128. The platform 128 may include the operating system of the electronic device 100 and one or more applications or features bundled with the operating system. The applications 128 may include both applications loaded by the manufacturer or seller of the electronic device 100 and third party applications. In some embodiments, the application/platform 128 may also programmatically generate data representative of a gesture and provide the gesture data to the gesture interpretation module 116 or the recording module 130. Such an application/platform 128 may be a help feature that animates the drawing of a straight line being written on the touch-sensitive display 102 to enable the user to practice drawing straight lines with a finger or stylus.

As shown, the memory 110 of the electronic device 100 further includes a recording module 130. The recording module 130 receives or retrieves data associated with a gesture from the touch sensors 106, from the gesture interpretation module 116, or from an application/platform 128. The recording module 130 may actively listen for gestures or may be invoked by another module, process, or application to record a received gesture. The received or retrieved gesture data includes both locations (e.g., pixel locations) on the touch-sensitive display 102 touched while inputting the gesture and times at which the locations were touched. Upon receiving or retrieving the gesture data, the recording module 130 stores the gesture data as a set of location/time pairs in a data structure 132.

In various embodiments, the data structure 132 is also stored in the memory 110 of the electronic device 100. The data structure receives and stores gesture data for use and retrieval. For example, machine learning algorithms may retrieve gesture data from the data structure 132 and use the gesture data to learn how to read human writing. Also, the animation module 134 may retrieve the gesture data from the data structure and use the retrieved data to cause display of an animation of the recorded gesture.

In some embodiments, an application/platform 128 may linearize the gesture data stored in the data structure 132, updating the locations to different positions that would have been touched had a user drawn an entirely straight line. The application/platform 128 may provide the gesture data to the gesture interpretation module 116 and, in response to the gesture interpretation module 116 determining the gesture was intended to be a straight line, linearize the gesture data.

As illustrated, the memory 110 of the electronic device 100 further includes an animation module 134. The animation module 134 generates a sequence of frame updates for the recorded gesture, each frame update including a part of the gesture. The animation module 134 may receive or retrieve the gesture data directly from the data structure 132 or indirectly, through an application/platform 128 that may invoke the animation module 134. The animation module 134 may also retrieve a frame rate for the touch-sensitive display 102 from the display controller 104. In other embodiments, such retrieval of the frame rate may be unnecessary as the animation module 134 may be configured with the frame rate. In yet another embodiment, the animation module 134 may query the frame allocation module 134 to estimate a number of applications seeking to concurrently update the electronic paper display 104 and may divide the frame rate by the sum of that number plus the animation module 134.

Upon receiving or retrieving the gesture data, the animation module 134 may use the times included in the gesture data to determine a total time interval over which the gesture was input on the electronic paper display 104. Such a time interval could be calculated by taking the difference of the time associated with the first location touched with the time associated with the last location touched. The animation module 134 then divides the calculated time interval by the frame rate to determine a number of time slots, one time slot for each frame update. After determining the time slots, the animation module 134 associations each time its location with one of the time slots. The locations associated with a time slot form the part of the gesture data included in the frame update for the time slot. Finally, the animation module 134 may generate the sequence of frame updates using the data associated with the time slots. The sequence of the frame updates corresponds to the sequence of the time slots, and each frame update includes the locations forming the part of the gesture data for that frame update and a specification of the region of the touch-sensitive display 102 that includes the locations forming the part of the gesture data.

In various embodiments, after generating the sequence of frame updates, the animation module 134 may provide the frame updates to the display controller 104 for sequential updating of the touch-sensitive display 102, or may first provide them to a frame allocation module 136 to balance access to the touch-sensitive display 102 between the animation module 134 and one or more other applications. Because each frame update updates only a bounded region of the touch-sensitive display 102 that is less than the entire display, the display controller 104 updates the corresponding region of the touch-sensitive display 102 defined by the specification included in the frame update while refraining from updating a remainder of the touch-sensitive display 102. This manner of sequential updating allows for each part of a gesture data included in a frame update to be added to parts of the gesture data included in previous frame updates. Overall, this manner of rendering gives the effect of animation, with the gesture appearing to be drawn by an invisible pen on the touch-sensitive display 102 as the user watches.

Finally, FIG. 1 illustrates that the memory 110 of the electronic device 100 may store a frame allocation module 136 that causes the display controller 104 to cycle between updating the touch-sensitive display 102 on behalf of the animation module 134 and one or more other applications 128. In order to ensure that both the updates of the animation module 134 and each application 128 are rendered smoothly and adequately, the frame allocation module 136 may allocate frame updates of the frame rate of the touch-sensitive display 102 across the animation module 134 and the application(s) 128.

In some embodiments, the frame allocation module 136 may allocate the frame rate of the touch-sensitive display 102 equally across the animation module 134 and the application(s) 128, or the frame allocation module 136 may allocate the frame rate unequally based on one or more weighting factors 138. These weighting factors 138 may include a priority of the animation module 134 or of an application 128, predefined preferences of a user operating the electronic device 100, and/or the like.

The frame allocation module 136 may cause the display controller 104 to implement this allocation in any number of ways. For instance, the module 136 may instruct the animation module 134 or the application(s) 128 themselves to request to update the touch-sensitive display 102 according to the allocated frame rates (e.g., 16 times per second) or the frame allocation module 136 may itself aggregate and vend these requests to the display controller 104 according to the allocated frame rate.

Furthermore, while FIG. 1 illustrates the frame allocation module 136 as residing in the memory 110, it is to be appreciated that other implementations may embed this functionality elsewhere. For instance, this functionality may reside in the display controller 104, in other locations of hardware and/or software of the device 100, or remotely from the device.

In some instances, the electronic device 100 may have features or functionality in addition to those that FIG. 1 illustrates. For example, the device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 100 may reside remotely from the device 100 in some implementations. In these implementations, the device 100 may utilize the network interfaces 112 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example Processes

Figure 2A:
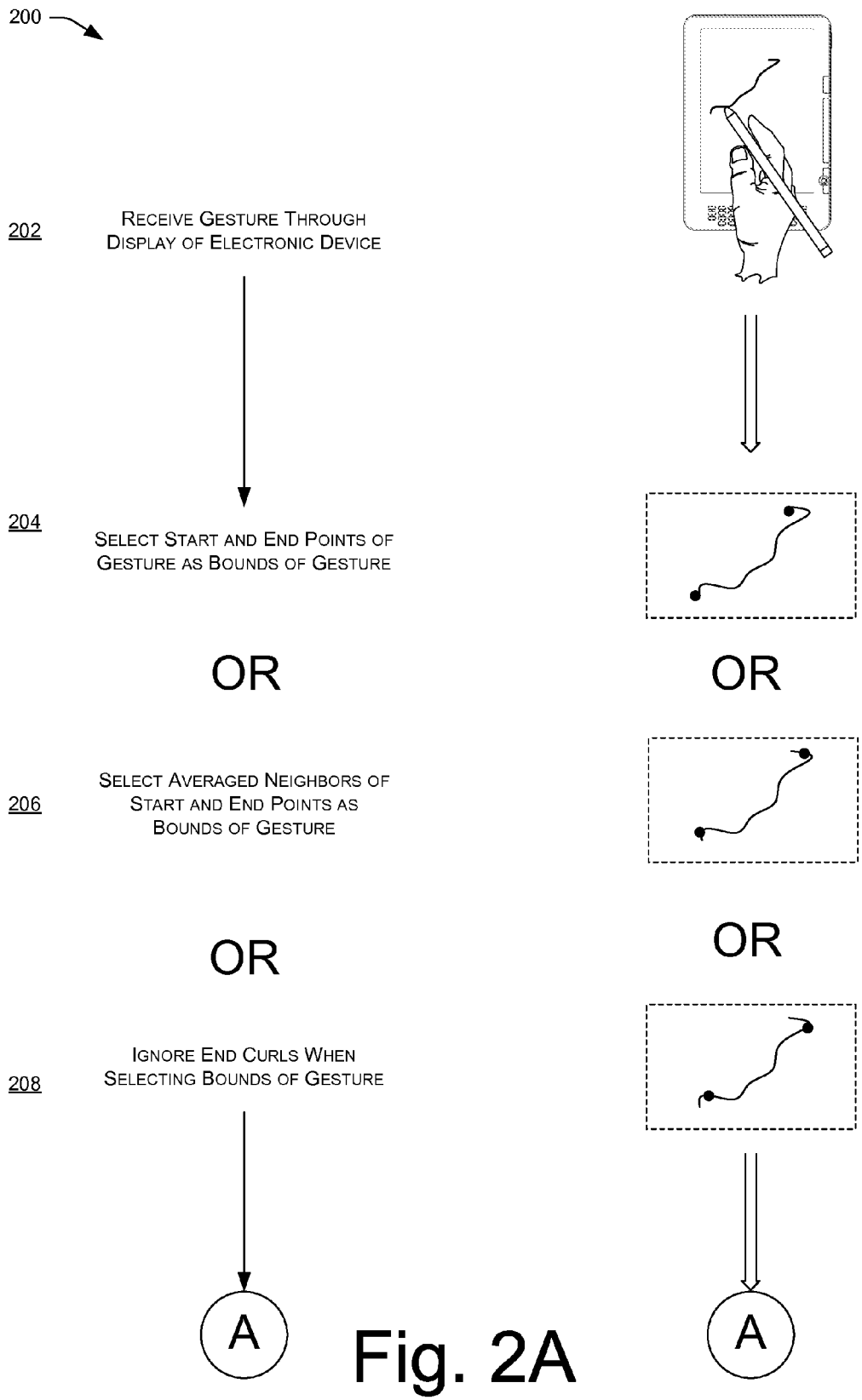
FIGS. 2A-2B illustrate an example process for receiving a gesture through a display of a device, defining an oriented bounding box for the gesture, determining based on the bounding box and threshold(s) whether the gesture approximates a straight line, and taking an action based on straight line gesture(s).
Figure 2B:
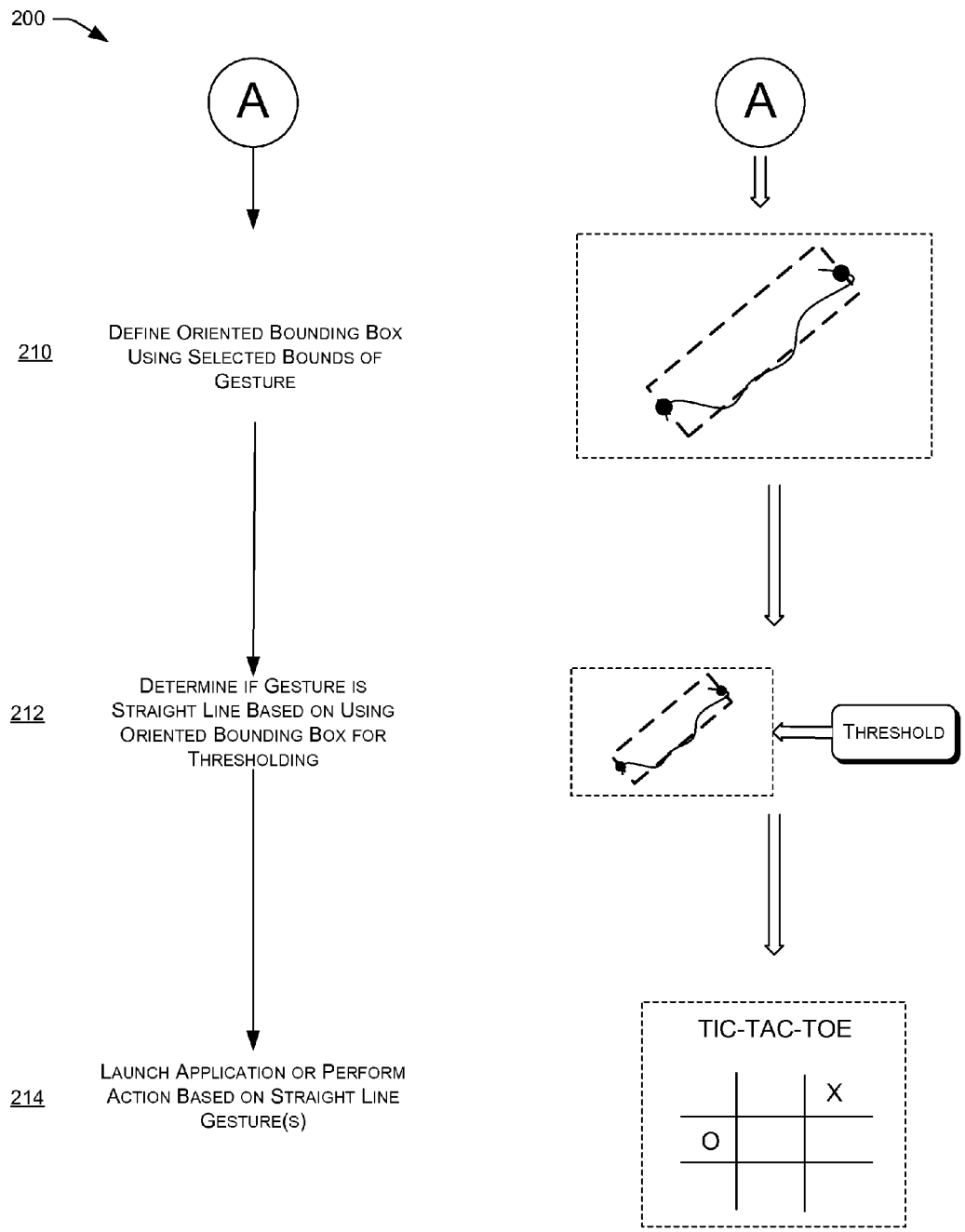

FIGS. 2A-2B illustrate an example process 200 for receiving a gesture through a display of a device, defining an oriented bounding box for the gesture, determining based on the bounding box and threshold(s) whether the gesture approximates a straight line, and taking an action based on a set of received straight line gestures. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 200 includes, at 202, the electronic device 100 receiving a gesture through a touch-sensitive display 102 and corresponding touch sensors 106 of the electronic device. The gesture may be input with a stylus, as is shown in FIG. 2A, or may instead be input with a user's finger. The electronic device 100 may then invoke the above-described gesture interpretation module 116 to interpret the received gesture.

At 204-208, the gesture interpretation module 116 invokes its bounding box module 118 to determine bounds of the received gesture. Each of 204, 206, and 208 illustrates an alternative that may be elected by the bounding box module 118. At 204, the bounding box module 118 selects the start and end points of the gesture as bounds of the gesture. The start and end points are the first and last points touched in making the gesture. At 206, the bounding box module 118 averages locations the start and end points with the locations of their nearest neighbors to and uses the resultant averaged points as the bounds of the gesture. At 208, the bounding box module 118 ignores the start and end points and their nearest neighbors and uses the points nearest to the ignored points as the bounds of the gesture. In some embodiments, the bounding box module 118 may elect among 204-208 based on profiles of user gestures found in a gesture database 122.

FIG. 2B continues the illustration of the process 200. At 210, the bounding box module 118 defines an oriented bounding box using the bounds of the gesture. This may involve interpolating a line between the bounds of the gesture, defining two lines substantially parallel to that line and having the same length as it, and defining two lines that are substantially perpendicular to the interpolated line to connect the two substantially parallel lines and form the oriented bounding box. In some embodiments, the length of the substantially perpendicular lines varies based on the length of the substantially parallel lines.

At 212, the gesture interpretation module 116 invokes its thresholding module 120 to determine the amount of the gesture that is contained within the bounding box and to further determine whether that amount meets or exceeds a threshold. If the amount meets or exceeds the threshold, the gesture interpretation module 116 determines that the gesture was intended to be a straight line.

At 214, a gesture set module 126 of the electronic device 100 launches an application 128 performs an action, such as launching a tic-tac-toe game or causing a lined paper graphic user interface to be rendered. The gesture set module 126 may perform the launch responsive to one or more sequential straight line gestures being determined by the gesture interpretation module 116. For example, in response to the user entering four straight lines making a tic-tac-toe grid, the gesture set module 126 may launch the tic-tac-toe game.

Figure 3A:
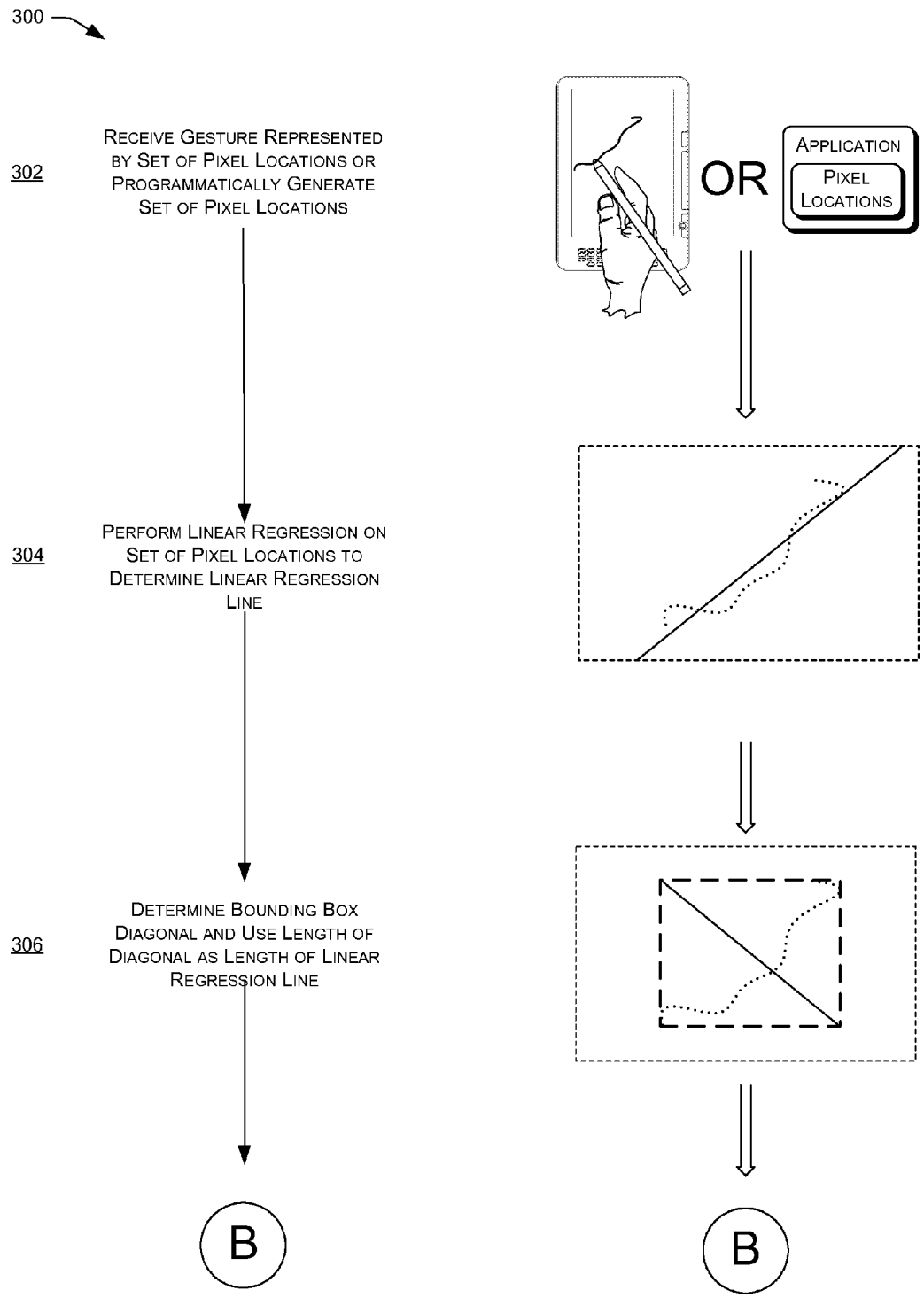
FIGS. 3A-3B illustrate an example process for receiving a set of pixel locations comprising a gesture, determining a linear regression line for the set, determining distances of the pixel locations from the linear regression line, and rendering the gesture as a straight line based on whether the distances do not exceed a threshold.
Figure 3B:
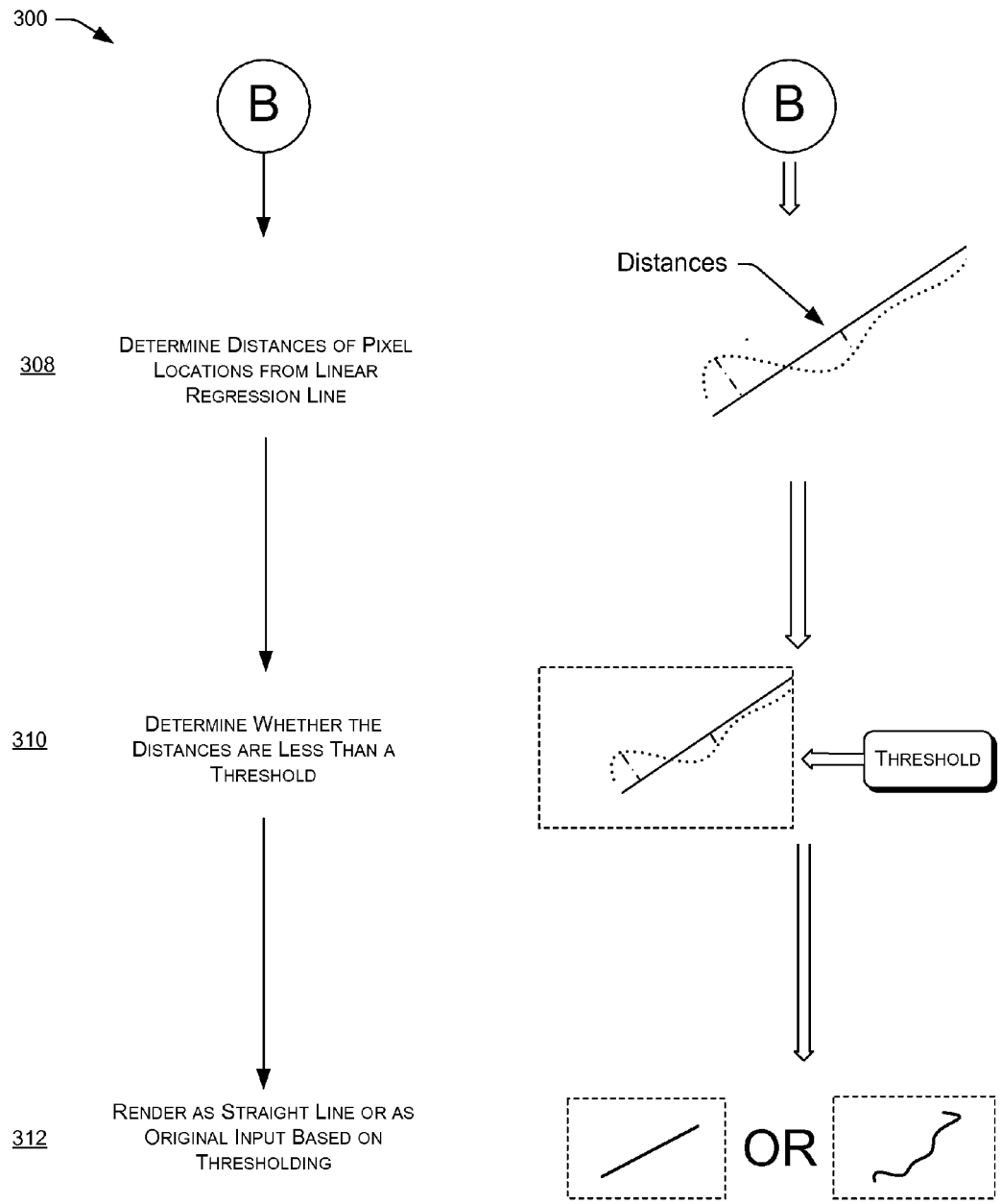

FIGS. 3A-3B illustrate an example process 300 for receiving a set of pixel locations comprising a gesture, determining a linear regression line for the set, determining distances of the pixel locations from the linear regression line, and rendering the gesture as a straight line based on whether the distances do not exceed a threshold.

The process 300 includes, at 302, an electronic device 100 receiving a set of pixel locations comprising a gesture through a touch-sensitive display 102 and corresponding touch sensors 106 of the electronic device. The gesture may be input with a stylus, as is shown in FIG. 3A, or may instead be input with a user's finger. Alternatively, at 302, an application 128 of the electronic device 100 may programmatically generate the set of pixel locations. The electronic device 100 may then invoke the above-described gesture interpretation module 116 to interpret the received or generated set of pixel locations.

At 304, the gesture interpretation module 116 determines an average location of a set of pixel locations comprising the gesture. Using this average location and a linear regression analysis on the set of pixel locations, the gesture interpretation module 116 determines a linear regression line for the gesture.

At 306, the gesture interpretation module 116 determines a length of the linear regression line. To determine the length, the gesture interpretation module 116 may define a boundary box to contain the gesture, the bounding box oriented to an x-y axis that is aligned with the display. The bounding box has a minimum size necessary to completely contain the pixel locations. The gesture interpretation module 116 then determines a diagonal of the bounding box and sets the length of the linear regression line to the length of the diagonal.

FIG. 3B continues the illustration of the process 300 and shows, at 308, the gesture interpretation module 116 measuring distances between the linear regression line and the pixel locations of the set of pixel locations. Each distance measured may be the shortest distance between a given pixel location and the linear regression line. At 310, the gesture interpretation module 116 may invoke its thresholding module 120 to determine if the averaged distances or total of the distances is less than a threshold.

At 312, the electronic device 100 renders the set of pixel locations on the touch-sensitive display 102 as a straight line if the averaged distances or total of the distances is less than a threshold. Also at 312, the electronic device 100 renders the set of pixel locations on the touch-sensitive display 102 as they were received or generated if the averaged distances or total of the distances meet or exceed a threshold. In rendering the set of pixel locations, the electronic device may invoke the display controller 104 or animation module 134. In some embodiments, the electronic device 100 renders the set of pixel locations as they were originally received or generated even if the averaged distances or total distances meet or exceed a threshold. In such embodiments, however, the electronic device may still interpret the gesture corresponding to the set of pixel locations as approximating a straight line.

Figure 4:
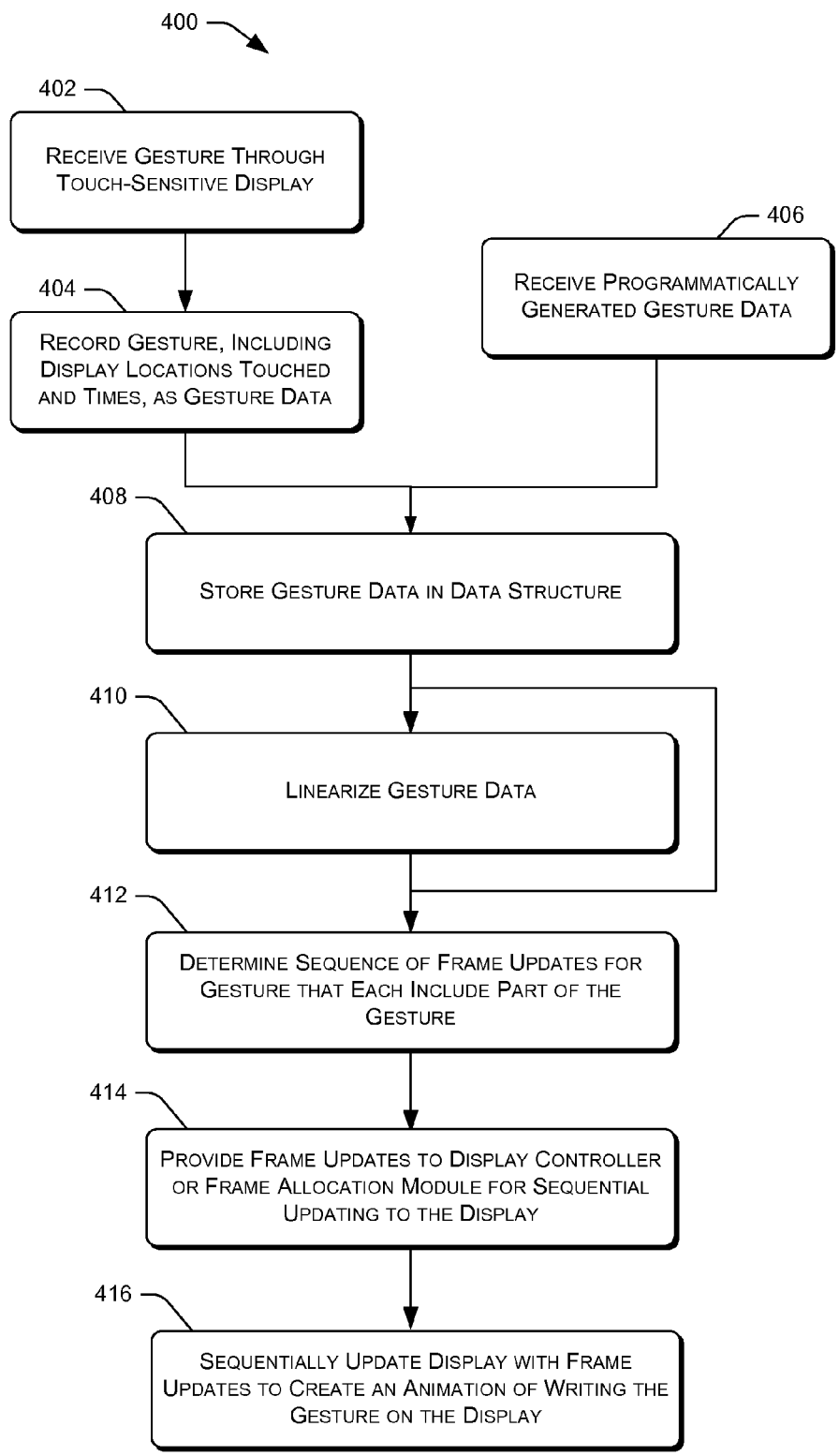
FIG. 4 illustrates an example process for recording a gesture received through a touch-sensitive display, determining a set of sequential frame updates for the gesture that each includes part of the gesture, and providing the frame updates to the touch-sensitive display for sequential updating of the display with the frame updates to create the effect of animating the display with the gesture.

FIG. 4 illustrates an example process 400 for recording a gesture received through a touch-sensitive display, determining a set of sequential frame updates for the gesture that each includes part of the gesture data, and providing the frame updates to the touch-sensitive display for sequential updating of the display with the frame updates to create the effect of animating the display with the writing of the gesture.

The process 400 includes, at 402, the electronic device 100 receiving a gesture through a touch-sensitive display 102, such as an electronic paper display, and corresponding touch sensors 106 of the electronic device. At 404, the electronic device 100 invokes a recording module 130 to record the received gesture as gesture data that includes the locations (e.g., pixel locations) on the touch-sensitive display 102 that were touched and the times at which the locations were touched. Alternatively to 402-404, an application 128 of the electronic device 100 may programmatically generate gesture data, such as locations and times of a gesture to be rendered. At 408, the recording module 130 or application 128 stores the respective recorded or generate gesture data in a data structure 132.

At 410, the electronic device 100 may invoke the gesture interpretation module 116 to determine if the recorded or generated gesture data is intended to be a straight line. If the gesture interpretation module 116 indicates that the gesture is intended to be a straight line, the electronic device 100 may linearize the gesture data stored in the data structure, modifying the locations so that they form as straight a line as possible given device constraints.

At 412, the electronic device 100 invokes an animation module 134 to determine a sequence of frame updates that each includes a part of the recorded or generated gesture data. As described in detail above, the animation module may divide a time interval over which the gesture was input by the frame rate of the electronic device 100. The result of the operation is a number of time slots and corresponding number of frame updates. Each time slot is associated with times in the data structure that fall within the time slot and locations associated with those times. In that way, locations forming a part of the gesture data are associated with a time slot, and the time slot with a corresponding frame update.

At 414, the animation module 134 provides the sequence of frame updates to the display controller 104 or the frame allocation module 136 for sequential updating of the touch-sensitive display 102. As mentioned above, the frame allocation module 136 allocates the updates of the touch-sensitive display 102 between the animation module 134 and one or more other applications 128 and then provides the frame updates to the display controller 104. At 416, the display controller 104 causes the touch-sensitive display 102 to be sequentially updated with the frame updates, adding each part of the gesture to those already displayed from previous frame updates. The effect is to create an animation of writing the gesture on the touch-sensitive display 102.

Figure 5:
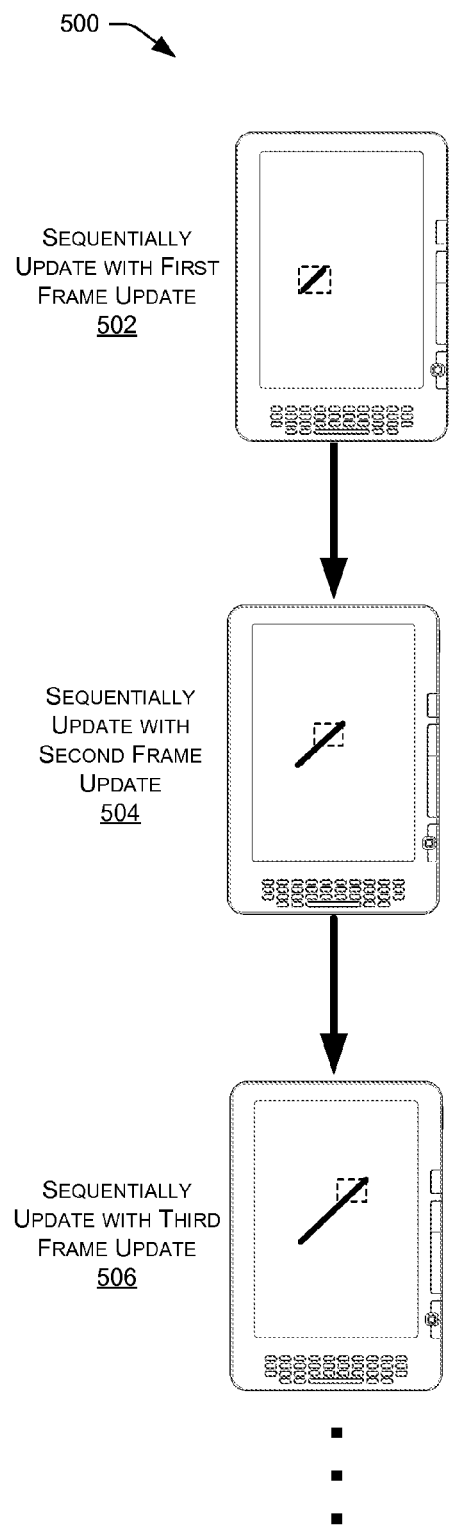
FIG. 5 illustrates an example process for sequentially updating a display in accordance with the example process of FIG. 4.

FIG. 5 illustrates an example process for sequentially updating a display in accordance with the example process of FIG. 4. At 502, the process 500 updates the touch-sensitive display 102 with a part of a gesture included in a first frame update. The first frame update includes pixel locations that form the part of the gesture and a specification that defines a bounded region of the display that is less than the entire surface of the touch-sensitive display 102. At 502, only pixels of the touch-sensitive display 102 within the bounded region are updated. All other pixels of the touch-sensitive display 102 retain their previous state.

At 504, the process sequentially updates the touch-sensitive display 102 to add a second part of the gesture to the already rendered first part of the gesture. The second part of the gesture is defined by pixel locations included in a second frame update that also includes a specification defining a bounded region of the touch-sensitive display 102 that is both different from the first bounded region and is less than the entire surface of the touch-sensitive display 102. Only pixels within this different bounded region are updated at 504. The effect is to retain the already rendered first part of the gesture while adding to it the second part of the gesture.

At 506, the process sequentially updates the touch-sensitive display 102 to add a third part of the gesture to the already rendered first and second parts of the gesture. The third part of the gesture is defined by pixel locations included in a third frame update that also includes a specification defining a bounded region of the touch-sensitive display 102 that is both different from the first and second bounded regions and is less than the entire surface of the touch-sensitive display 102. Only pixels within this different bounded region are updated at 506. The effect is to retain the already rendered first and second parts of the gesture while adding to them the third part of the gesture.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device comprising:
a processor;
an electronic paper display coupled to the processor and configured to display at least one of frames of text or graphics at a frame rate;
a touch sensor configured to receive touch input through a surface;
a recording module that, when executed by the processor, records gesture data corresponding to a gesture received by the touch sensor, the gesture data including a first location of the surface touched at a first time and a second location of the surface touched at a second time; and
an animation module that, when executed by the processor:
determines a user profile associated with the electronic device;
determines that the gesture was intended to approximate a straight line utilizing a bounding box and one or more thresholds, one or more characteristics of the bounding box being determined based at least in part on an end point of the gesture data, the end point being determined based at least in part on at least one of a location associated with a set of gesture points that correspond to an end of the gesture or ignoring a preset number of gesture points at the end of the gesture, the straight line being determined based at least in part on a gesture profile associated with the user profile, wherein the straight line is different than the gesture data;
determines a sequence of frame updates, a frame update of the sequence of frame updates including at least a part of one of the gesture data or other data associated with the straight line based on at least one of a time at which a particular location was touched, a time interval in which the gesture was received, or the frame rate; and
provides the sequence of frame updates for sequential updating of the electronic paper display over a different time interval that approximates the time interval in which the gesture was received.

2. The electronic device of claim 1, further comprising a data structure configured to store the gesture data.

3. The electronic device of claim 2, wherein the data structure is further configured to store gesture data representing programmatically-generated gestures.

4. The electronic device of claim 1, further comprising a display controller coupled to the electronic paper display and configured to receive the sequence of frame updates and cause sequential updating of the electronic paper display at the frame rate, the sequence of frame updates adding a part of the gesture included in the sequence of frame updates to at least another part of the gesture captured in at least a previously rendered frame update of the sequence of frame updates.

5. The electronic device of claim 1, further comprising a frame allocation module configured to allocate frame updates of the electronic paper display among a plurality of applications and components, the plurality of applications and components including the animation module.

6. The electronic device of claim 5, wherein the frame allocation module utilizes one or more weighting factors used to assign priorities to the plurality of applications and components.

7. The electronic device of claim 1, wherein the animation module is further executable by the processor to:
determine that the gesture was intended to approximate the straight line by utilizing regression analysis; and modify the gesture data to substantially linearize the gesture data.

8. A computer-implemented method comprising:
recording gesture data corresponding to a gesture received at a touch-sensitive display, the gesture data including two or more locations of the touch-sensitive display touched during a time interval in which the gesture is received;
determining a user profile associated with a device that includes the touch-sensitive display;
determining that the gesture was intended to approximate a straight line by utilizing a bounding box and one or more thresholds, one or more characteristics of the bounding box being determined based at least in part on an end point of the gesture data, the end point being determined based at least in part on at least one of a location associated with a set of gesture points that correspond to an end of the gesture or ignoring a preset number of gesture points at the end of the gesture,
wherein determining the straight line is based at least in part on a gesture profile associated with the user profile, the straight line being different than the gesture;

determining a sequence of frame updates that include at least a part of one of the gesture data or data associated with the straight line; and providing the sequence of frame updates for sequential updating of the touch-sensitive display over a different time interval that substantially corresponds to the time interval in which the gesture was received.

9. The method of claim 8, wherein the gesture is received at the touch-sensitive display through use of a stylus on the touch-sensitive display.

10. The method of claim 8, further comprising storing the gesture data in a data structure.

11. The method of claim 8, further comprising utilizing the gesture data to train machine learning algorithms for reading human writing.

12. The method of claim 8, wherein the determining further comprises:

dividing, by a frame rate of the touch-sensitive display, the time interval in which the gesture was received into two or more time slots, individual time slots of the two or more time slots being associated with a different frame update of the sequence of frame updates; and associating a first location of the two or more locations with a first frame update of the sequence of frame updates based on correspondence of a particular time slot associated with the first frame update with a time at which the first location was touched.

13. The method of claim 8, wherein the determining further comprises at least in response to the determination that the gesture was intended to approximate the straight line, modifying the gesture data to substantially linearize the gesture data.

14. The method of claim 8, wherein the providing comprises causing sequential updating of the touch-sensitive display at a frame rate of the touch-sensitive display, a frame update of the sequence of frame updates adding a part of a gesture included in the frame update to at least another part of the gesture captured in at least a previously rendered frame update of the sequence of frame updates.

15. One or more non-transitory computer-readable storage media having stored thereon computer-executable instructions configured to program an electronic device to perform operations including:

retrieving, from a data structure, gesture data representative of a gesture to be rendered on a touch-sensitive display, the gesture data including a set of locations on the touch-sensitive display that comprise the gesture and a sequence of times, individual times of the sequence of times being associated with a location of the set of locations;

determining that the gesture was intended to approximate a straight line by utilizing a bounding box and one or more thresholds, one or more characteristics of the bounding box being determined based at least in part on an end point of the gesture data, the end point being determined based at least in part on at least one of a location of the set of locations associated with a set of gesture points that correspond to an end of the gesture or ignoring a preset number of gesture points at the end of the gesture, and wherein the straight line is different than the gesture;

determining a sequence of frame updates for the gesture that include a part of at least the gesture data or data associated with the straight line; and providing the sequence of frame updates for sequential updating of the touch-sensitive display over a time interval in which the gesture is to be rendered.

16. The one or more non-transitory computer-readable storage media of claim 15, wherein the gesture data is recorded from touch input or is programmatically generated.

17. The one or more non-transitory computer-readable storage media of claim 16, wherein the gesture data is programmatically generated and the programmatically generated gesture data corresponds to an animation of writing on the touch-sensitive display.

18. The one or more non-transitory computer-readable storage media of claim 15, wherein the operations further include storing data representing the locations and times of the gesture in a data structure.

19. The one or more non-transitory computer-readable storage media of claim 15, wherein the determining further comprises:

dividing, by a frame rate of the electronic device, the time interval over which the gesture is to be rendered into two or more time slots, individual time slots of the two or more time slots being associated with a frame update of the sequence of frame updates; and associating a first location of the set of locations with a first frame update of the sequence of frame updates based on the first location having been touched during a particular time slot associated with the first frame update.

* * * * *